Dec. 12, 1939.  G. R. THOMPSON  2,182,858
BINDER OR HOLDER FOR GROUPS OF PERIODICALS AND
THE LIKE, AND ELEMENTS THEREOF
Filed Feb. 7, 1939   3 Sheets-Sheet 2
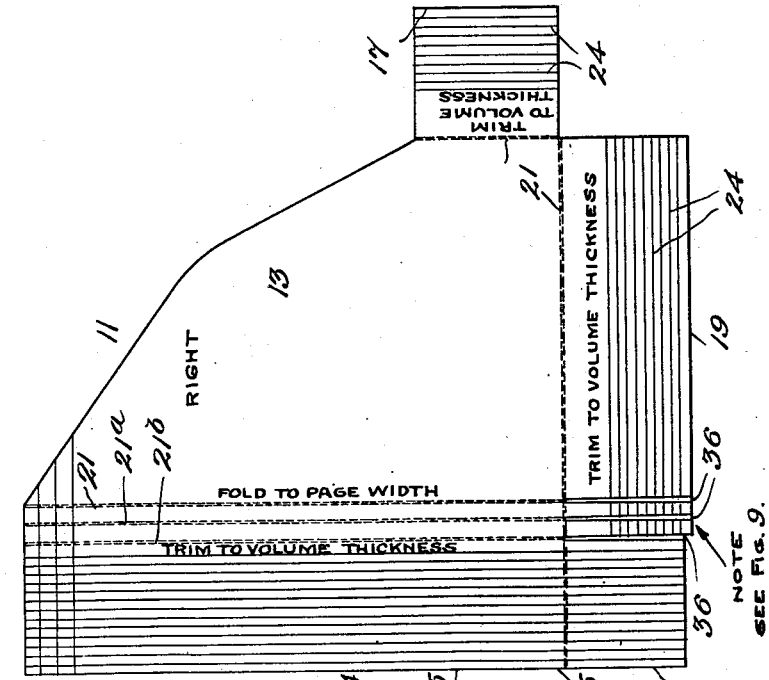
Fig. 8.
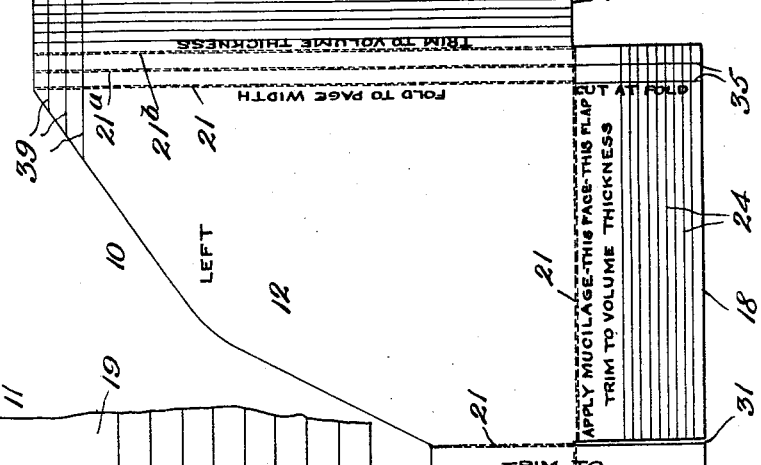
Fig. 9.
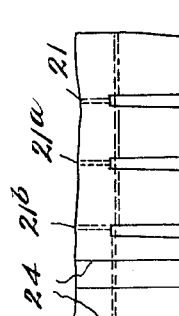

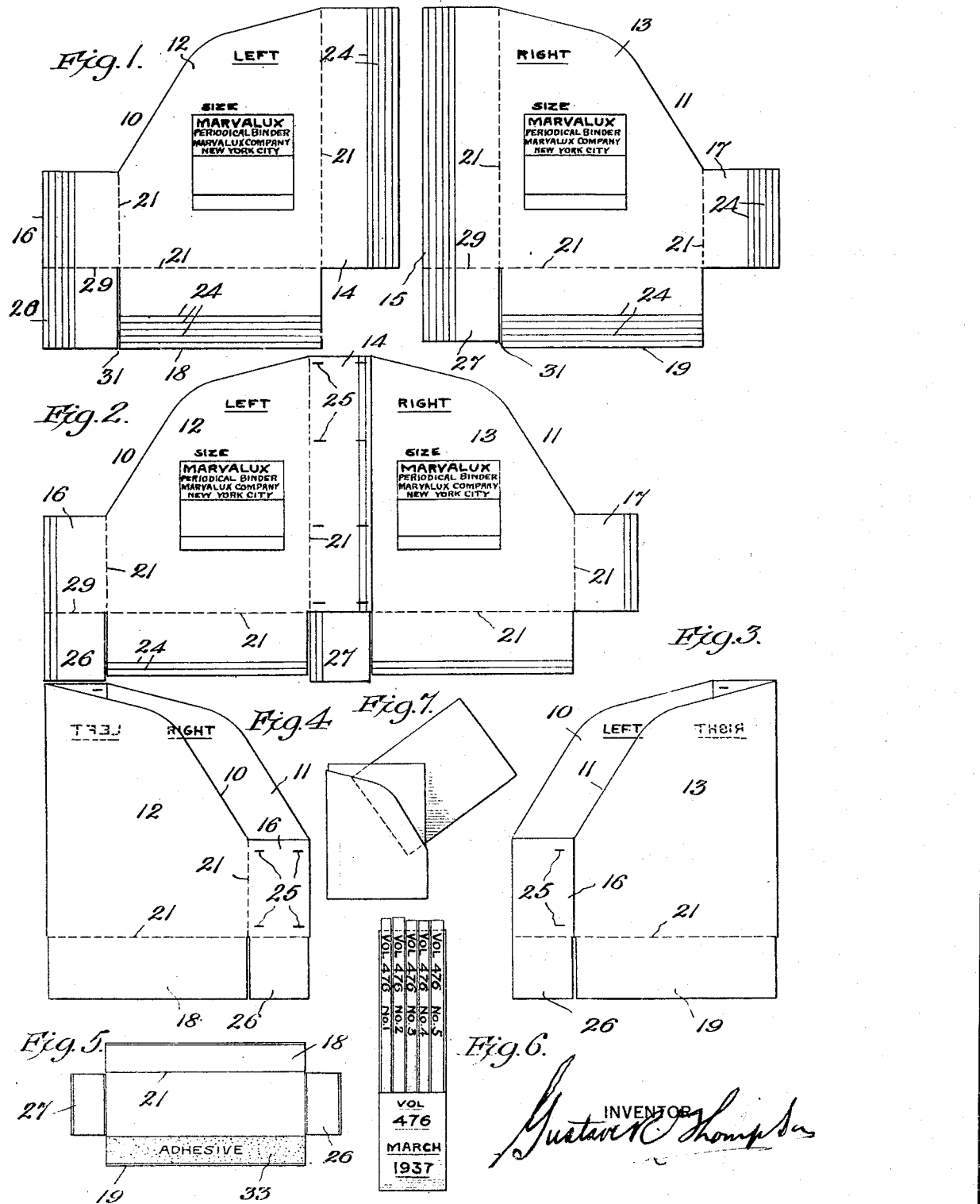

Dec. 12, 1939.  G. R. THOMPSON  2,182,858
BINDER OR HOLDER FOR GROUPS OF PERIODICALS AND
THE LIKE, AND ELEMENTS THEREOF
Filed Feb. 7, 1939  3 Sheets-Sheet 3
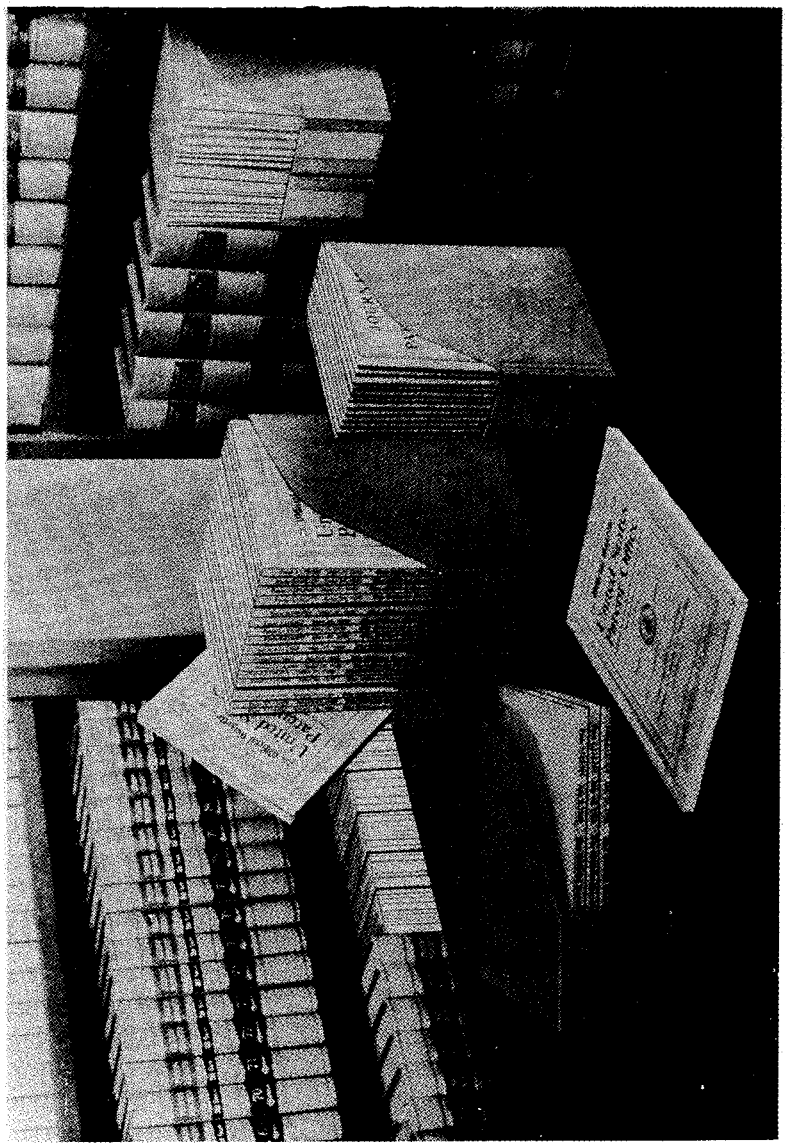
Fig. 10.
INVENTOR.

Patented Dec. 12, 1939

2,182,858

UNITED STATES PATENT OFFICE 2,182,858

BINDER OR HOLDER FOR GROUPS OF PERIODICALS AND THE LIKE, AND ELEMENTS THEREOF

Gustave R. Thompson, New York, N. Y.

Application February 7, 1939, Serial No. 254,985

9 Claims. (Cl. 229—23)

This invention relates to binders or holders for periodicals and the like in volumes and other groups, and to the associated elements or parts thereof constituting a commodity unit, and provides improvements therein.

There are many serial magazines, periodicals, pamphlets, catalogue-sections, printed and typed matter, and the like, especially in the engineering, scientific, trade, business, hobby, literary, artistic and professional fields, which the owners usually do not desire to go to the expense of binding, but which it is nevertheless important or desirable to them to keep. These usually lie around in disorderly heaps, become marred and soiled, issues are difficult to find when wanted, and become lost and misplaced, are difficult to remove and replace, either when in piles, or bundles, or on book-shelves, do not stand unsupported, and on shelves lean against one another, sag, become distorted, curled, creased and bowed and require exertions which are considerable, and often awkward, to remove and replace, especially when the particular periodical wanted is situated on a low shelf or in the mid-section of a long shelf-row. The appearance on shelves is usually very disorderly and objectionable. For such magazines, periodicals and the like there is no economical means of satisfactorily protecting, keeping in order, or in volume or other groupings, of avoiding misplacement and loss, providing ready accessibility, removal and replacement on shelves, providing rigidity and stability to stand independently book-wise on shelves, tables and the like, or of marking the spine or outwardly-facing part to indicate the contents. Lack of such a means has existed for many years, and attempts have been made over a period of many years to provide a means which would satisfactorily meet the need and desire therefor; the present applicant has attempted to solve the problem for thirty years and more. The problem was presented to him initially by the Official Gazette of the United States Patent Office, and later by many other legal and scientific periodicals. Previous attempts to solve the problem have been in the direction of contriving binders of the so-called temporary type, boxes, boards provided with tapes, and cabinets of various kinds. These have objections: most of them approximate or exceed the cost of binding; many types are inconvenient and expensive of time to use; many types are bulky and cannot be economically stored for future use; and many require perforation of the contents, strain, mutilate and tear apart the pages, especially in volume and other grouping of considerable "bulk" or thickness, require special devices and attachments for fastening the contents, and are often neither strong nor durable; and many do not accommodate themselves either well or efficiently to the considerable variations which occur in the "trim" size and in "bulk" or thickness of volumes and other grouped matter. For example, the Official Gazette has four issues to a volume about 8 times a year, and five issues to a volume about 4 times a year, and the bulk or thickness of the individual Gazettes also varies considerably. Moreover, there is a great variation in the page and "trim" size (height and width) as is shown by such publications as N. W. Ayer & Son's Directory of Newspapers and Periodicals (N. W. Ayer & Son, Philadelphia, Pennsylvania) and Ulrich's Periodical Directory (R. Bowker & Co., New York city).

The present invention provides a means combining in itself the manifold properties, qualities and capabilities to meet in a most satisfactory and complete manner the need heretofore existing for an economical and readily usable binder or holder for periodicals, and other matter of the character heretofore referred to, in groups, and overcomes most completely and comprehensively the various deficiencies and objections hereinbefore set out to previously existing means.

In particular, the present invention provides a means which is extremely simple, economical, strong and durable; which can be stored flat and be readily set up or put together in a very simple and easy manner; which can be fitted to the "bulk" or volume-thickness of a volume group or the like through a wide range or variation, so that the group may be held snugly or bound, and thereby maintain the form and shape of the contents, and have stability and can stand on edge or book-wise; which requires only simple and commonly available implements for putting together,—a cutting-board or shears and a stapling machine, available in most offices; which can be put together on any flat surface, and requires no special tools, forms or anvils for setting up or putting together, which has no metal parts on its bottom to scratch desk tops and shelves when placed thereon; which is readily adaptable to having the contents indicated on the front or "spine"; which may be used in a way to expose data (name, volume and part number, date, etc.) which appears on the spines of some periodicals; and which admits of the ready removal and replacement of individual periodicals, magazines, etc., freedom being provided at one corner of the binder to enable a unit to be readily grasped and removed, or replaced, without producing excessive strain on the binder.

The invention may also provide for fitting the binder to the "trim" size page-width of periodicals, etc., through a considerable range of variation. "Trim" size page-heights greater than the height of the binder can be accommodated, but the invention may also provide for fitting the binder height to the "trim" size page-height. It will therefore be seen that the invention provides primarily for the variation in bulk or volume-thickness almost invariably encountered in groups (as a volume-group) of magazines, periodicals and the like, having the same "trim" size. It may also provide for variations in the "trim" size (page-width as well as page-height), and thereby greatly economize in the number of stock-sizes to take care of the great variety in the "trim" sizes of periodicals, etc., and consequently in the production-equipment for producing binders to meet all requirements.

Two embodiments of the invention are illustrated in the accompanying drawings, wherein:

Fig. 1 is a plan view of a pair of substantially enantiomorphic pieces of sheet material, which, when assembled and set up, constitute the binder or holder.

Fig. 2 is a plan view showing the pair of substantially enantiomorphic pieces trimmed to conform to the bulk or volume-thickness of the group of periodicals to be held therein, and with two of the end-flaps overlapped and stapled to fasten them together.

Fig. 3 is a plan view of the assembly shown in Fig. 2 folded on a flat surface so as to overlap the second pair of end-flaps and fastened together by staples at one side.

Fig. 4 is a view similar to Fig. 3 showing the connected pieces reversed by swinging them through an angle of 180°, and with staples applied to the other side of the second pair of end-flaps.

Fig. 5 is a bottom plan view, with the end and bottom flaps spread outwardly to better show the construction.

Fig. 6 is a front elevation illustrating the pair of substantially enantiomorphic pieces assembled and set up, and binding and holding a volume group of periodicals.

Fig. 7 is a view of the binder and its contents illustrating the mode of inserting and removing one of the units or periodicals of the volume-group.

Fig. 8 is a plan view of a second embodiment of a pair of the substantially enantiomorphic pieces of sheet material constituting a binder.

Fig. 9 is a view illustrating in enlarged detail a portion of the right-hand one of the pair of pieces illustrated in Fig. 8, near the lower left-hand corner thereof.

Fig. 10 is a perspective view, from a photograph, illustrating the use of the binder.

Referring to said drawings, numerals 10 and 11 indicate a pair of substantially enantiomorphic pieces of sheet material. The sheet material should be tough and strong, capable of being readily folded along a creased or weakened line, and capable of being cut by an ordinary severing device, as hand shears or the knife of a cutting board such as used in offices, etc. In practice a 30 point fiber board has been used.

A pair of the substantially enantiomorphic pieces 10 and 11 is used and sold as a commodity unit.

Each of the pieces 10 and 11 have body or side-forming portions 12, 13, front end-flaps 14 and 15, back end-flaps 16 and 17, and bottom flaps 18, 19. The flaps 14 to 19 have weakened lines or creases 21 between them and the body portions 12, 13.

The flaps 14 to 19 have a width corresponding to the maximum bulk, or volume-thickness, according to experience or custom, of groups of serial magazines or periodicals and the like included in a volume. The experience and custom in this regard, found as the result of considerable research, is that magazines or periodicals having a small or medium "trim" size, in some instances, have a maximum bulk or volume-thickness somewhat greater than the maximum volume-thickness of magazines or periodicals having a large "trim" size. The maximum bulk or volume-thickness for magazines or periodicals of all "trim" sizes has been found to be approximately four inches, and for large "trim" sizes, about three inches. The flaps, being of a width corresponding to the maximum bulk or volume-thickness of periodicals or magazines, afford material at the free margins which may be trimmed or severed to fit the assembled enantiomorphic pieces 10 and 11 to the bulk or volume-thickness of any particular group of magazines or periodicals making up or included in a volume.

Guides 24 for cutting or trimming are provided along the margins of the flaps. These guides 24 are conveniently in the form of printed or impressed lines or lines of perforations running lengthwise of the flaps parallel to a free margin.

One of the end-flaps of each pair of the enantiomorphic pieces 10 and 11, here shown as the end-flaps 16 and 17, is made shorter than the other end-flaps 14, 15, and the upper portion of each of the body or side-constituting portions 12, 13 is cut so as to slant from the longer end-flap 14 or 15 to the shorter end-flap 16 or 17. The edge of the upper portion of each of the body or side-constituting portions 12, 13 advantageously has substantially the contour shown in the drawings. The end-flaps, one shorter than the other, and the slanting upper edge of the body or side-constituting portions 12, 13, have a number of very practical advantages. In assembling a pair of pieces 10 and 11, a wire stapling device, such as is widely used in offices, (or another form of pronged fastener applying machine) may have the arm which carries the die inserted between one of the body portions 12, 13 and the overlapped flaps 16 and 17, with the pieces 10 and 11, and the arm of the stapling machine which carries the die, resting on a flat surface, and a staple 25 applied. The ordinary throat-depth of a stapling machine is about four inches, and by making the end-flaps 16, 17 about four inches in length, the staples 25 may be applied to fasten together the overlapped flaps 16 and 17, at top and bottom, without withdrawing the arm of the stapling machine, and, as already stated with the parts in a position in which the stapling machine bears against a flat surface, as for example a desk or table-top. The shorter end-flaps 16, 17 and the slanting upper edge of the body portions 12, 13, have the further advantage of providing the binder, in its assembled position, with a free corner. This corner provides freedom at an upper corner of the contents of the binder, and enables the periodicals to be readily separated so that the fingers may grasp an individual periodical or unit, and the unit thereby readily removed or replaced without producing undue or excessive strain on the binder. By the construction described, the removal and replacement of individual periodicals or units is made surprisingly easy, even though the group of periodicals is bound or held together quite snugly in the binder.

Said described construction has the further advantage that much of the data on the backs or spines of the individual periodicals or units is exposed clearly to view, so that the selection of the desired individual periodical or unit is immediate. In the case of the Official Gazette, there is exposed the date of each individual issue of the Gazette.

Two or more of the end-flaps 14 to 17 are advantageously provided with flap extensions, two such extensions 26, 27 being here shown, one on the enantiomorphic piece 10 and the other on the piece 11. The material between the end-flaps 15 and 16, and the end-flap extensions 26, 27 is weakened, as by a crease 29, substantially in line with the creases 21 between the bottom flaps 18 and 19 and the body portions 12 and 13, to facilitate the folding thereof. The end-flap extensions 26, 27 extend across the bottom flaps 18 and 19, and when the pieces 10 and 11 are assembled, the end-flap extensions 26 and 27 overlie at each end, the lapped bottom flaps 18, 19. The stiffness of the binder when the pieces 10 and 11 are assembled, is much increased by the overlapping end-flaps 14, 15, 16, and 17, and by the end-flap extensions 26 and 27 folded over the lapped bottom flaps 18 and 19.

The flap-extension 27, which is an extension of the long flap 15, is advantageously of less length than the width of the bottom flap. The shortening of the end-flap extension enables the lower portions of the lapped end-flaps 14, 15, to be brought between the die and the plunger of an ordinary stapling machine and staples applied to fasten the overlapped flaps 14 and 15 at their lower end, the shortened end-flap extension 27 projecting without obstruction into the throat of the stapling machine. The limitation of the length of the end-flap extension, to accommodate it to the throat-depth of an ordinary stapling machine, makes it easy to use the stapling machine, especially in those cases where a length of the end-flap extension corresponding to the width of the bottom flap would prevent the die and plunger of the stapling machine reaching a position on the lower portion of the overlapped flaps 14, 15. The material is cut or notched between the bottom flap and an adjacent end-flap extension, as indicated at 31, Fig. 1.

The bottom flaps are advantageously fastened together, when folded to overlap, in a manner and by means which present a smooth bottom surface to a table-top or shelf on which the binder and its contents may be placed. It is desirable to avoid the use of a pronged fastener, or other fastening means, which would have a metallic part which would be exposed at the bottom of the binder. It is also highly desirable to effect the fastening of the bottom flaps in the manner and by means which require no special anvil or implement to apply the fastening means. The fastening means is advantageously an adhesive, indicated by the numeral 33, Fig. 5. The adhesive may be applied to the upper face of the bottom flap which is to lie lowermost when the pieces 10 and 11 are assembled. The adhesive may be applied in the course of manufacture of the pieces 10 and 11, or at the time of assembling the pieces 10 and 11 to form a binder. To obtain an effective joint by means of an adhesive it is practically necessary to have a press of some kind to hold the flaps, with the adhesive between, together until the adhesive sets. The binder has been designed to avoid the use of a press. The effect of a press is obtained by standing the assembly of the pieces 10, 11 on its bottom, with the bottom flaps overlapped and with the adhesive in between and in an active state, and inserting the periodicals in the binder, and then allowing the binder and its contents to stand on a flat surface until the adhesive sets. It has been found that sufficient pressure is obtained from the weight of the contents to produce an entirely satisfactory fastening of the bottom flaps together by means of an adhesive.

Owing to the great variation in the "trim" sizes of magazines and periodicals, it is highly desirable to reduce the number of sizes of pairs of the enantiomorphic pieces 10 and 11, which is required to accommodate substantially all "trim" sizes of magazines, periodicals, etc. The "trim" size page-height of periodicals, usually has a proportional relationship to the "trim" size page-width, so that an adjustment as to "trim" size page-width through selected ranges of variation, will accomplish much in the way of reducing the number of sizes of the pieces 10, 11 for substantially universal use. The binder is open at the top, and in many cases it may not be objectionable to have the higher periodicals in a "trim" size range project above the top of the end-flaps, though, as hereinbefore pointed out the pieces 10, 11 may be made in such a way that the length of the end-flaps may be made to conform to the "trim" size page-height of periodicals.

An embodiment of the invention in which the pair of substantially enantiomorphic pieces 10 and 11 is constructed in a manner to conform to variations in the "trim" size page-width, through a range of variation, and also to conform to variations in "trim" size page-height, is illustrated in Figs. 8 and 9. That is, in addition to the construction being conformable to variations in the bulk or volume-thickness of groups of periodicals, etc., the construction may also be such as to be conformable to variations in the "trim" size page-width of periodicals, etc., through a range of variation, and may also be conformable to variations in "trim" size page-height of periodicals.

To be conformable to variations in "trim" size page-width, each piece 10, 11 may be provided with a plurality of creases or weakened lines 21a, 21b in addition to the crease or weakened line 21, adjacent the end flaps 14 and 15. In setting up the binder the pieces 10, 11 are folded on the crease or weakened line 21, 21a, 21b, which conforms closest to the "trim" size page-width of the periodicals which the assembled binder is designed to hold. The part of the material between the outside creases 21—21b, becomes a part of the body or side-constituting portion, or of the end-flap, or of both the body and the end-flap, as the case may be.

The bottom flaps 18 and 19 are extended beneath the plurality of creases 21, 21b, and this extended portion is cut in line with the crease on which the piece is folded. Guides, as printed or impressed lines, or lines of perforations, 35, 36, may be, and preferably are, provided for guiding the cutting of the extended portion of the bottom flap. The guides 36 are preferably each double, so as to provide a notch in line with the crease 21, 21a, or 21b on which the piece 11 is folded. An enlarged detail of the construction at the lower left-hand portion of the right-hand piece 11 as shown in Fig. 8, is illustrated in Fig. 9.

To be conformable to variations in "trim" size page-height, the body portions 12 and 13, and the end-flaps 14 and 15 have a height corresponding to the maximum height of periodicals within a chosen "trim" size range. In setting up the pieces 10 and 11, the upper portions of the body portions 12 and 13 and of the end-flaps 14 and 15 may be trimmed or severed to conform to the "trim" size page-height of the group of periodicals which it is intended to use in the binder. Guides 39 in the form of printed, indented or perforated lines may be provided as an aid to trimming.

*Mode of assembling*

A group of magazines, periodicals or the like, making up a volume, or some other chosen group, is measured across the combined backs to obtain the bulk or volume-thickness. A pair of enantiomorphic pieces 10 and 11 having bodies or side-constituting portions 12 and 13 conforming closely to the "trim" size of the group of periodicals (or a pair provided with a plurality of creases adjacent the end-flaps 14 and 15 which may be folded to substantially one or another "trim" size page-width) is chosen. The pieces 10 and 11 are ordinarily sold and used as a commodity unit in flat form. The flaps 14 to 17 inclusive, are trimmed along the guides 24 to reduce the width of the flaps to the ascertained bulk or volume-thickness of the group of periodicals, etc., to be used with the binder. At this stage each of the pieces 10 and 11 may have the flaps initially folded on the creased or weakened lines 21. In the embodiment, Figs. 8 and 9, the pieces 10 and 11 would be folded on the crease or weakened lines 21—21b conforming to the "trim" size page-width, and the extensions of the bottom flaps 18 and 19 cut or notched in line with the fold, the cutting being done along the appropriate guides 35, 36. The top portion of the pieces 10 and 11 would also be trimmed along an appropriate guide 39.

With the pieces 10 and 11 lying flat on a table or desk, the end-flap 14 of the left-hand piece 10 would be laid on the end-flap 15 of the piece 11 so as to overlap. The pieces in this state and condition are illustrated in Fig. 2. While thus overlapped, the arm of a stapling machine which carries the die, resting on the desk or table, is inserted beneath the overlapped flaps, and the overlapped flaps fastened together by staples 25, the stapling being done near the top, and then as far down on the end-flaps as the depth of the throat will permit. The arm which carries the die of the stapling machine is then inserted beneath the flaps 14, 15 from the lower end, and the lowermost portions of the end-flaps fastened together by the staples. The end-flap extension 27 is then folded inward, and the flaps inserted into the throat of the stapling machine as far as they will go, and additional staples applied.

With the end-flaps 14 and 15 fastened together as just explained, while resting flat upon a desk or table, the piece 11 is folded so that the body portion 13 partially overlaps the body portion 12. The end-flap 16 is then folded so as to overlap the end-flap 17. The arm of the stapling machine which carries the die is then placed on the body portion 12, beneath the overlapped flaps 16 and 17, and a staple 25 applied to the upper right-hand corner of the overlapped flaps 16 and 17. The stapling machine is then slid downward, the flaps entering the throat of the machine, and another staple applied at the lower right-hand corner of the overlapped end-flaps. The parts in the position and state just described are illustrated in Fig. 3.

While still resting flat upon a desk or table, the pieces 10 and 11 are swung through 180° so as to bring the body or side-constituting portion 13 against the table or desk top. This position is shown in Fig. 4. The arm of the stapling machine which carries the die is then placed on the body portion 12 beneath the overlapped flaps 16 and 17, and staples applied at the upper and lower left-hand corners of the flaps in the manner similar to that previously described. During the use of the stapling machine it bears against a flat surface, and the construction of the enantiomorphic pieces 10 and 11 has been designed to enable a stapling machine to be used in that way.

The bottom flaps 18, 19 are now ready to be fastened together. The end-flap extensions 26, 27 are turned inward. One of the bottom flaps, as the flap 18, is then turned inward, and the other flap, as the flap 19, is folded upon it, so as to overlap. Prior to folding over the lowermost flap, mucilage or other adhesive is applied to its inner face (or if mucilage or glue has been applied to the inner face as a coating in the course of manufacture, the coating is made tacky by moistening). The lowermost flap with the tacky adhesive thereon is then pressed against the other bottom flap and the assembled pieces 10 and 11 stood upright on a flat surface, as a desk or table top. The group of periodicals which the binder has been assembled to fit, is immediately put into the binder, and the binder with its contents is left to stand until the adhesive sets. The binder in this state is illustrated in Fig. 6. It has been found in practice that pressure due to the weight of the contents is sufficient to obtain good adhesion between the bottom flaps. The bottom of the binder which rests on the shelf is thereby constituted by the material of the binder itself and is minus projections or parts of fastening means, and the binder may therefore be used without scratching or marring the tops of tables or shelves on which it may be placed.

By conforming the binder to the bulk or volume-thickness of the group of periodicals or the like, contained therein, the contents are held snugly, and sagging, bowing and creasing of the pages is prevented. The binder and its contents are very stable and readily stand bookwise on table tops and on shelves.

Individual periodicals or units are readily removed from and replaced in the binder. The contents being left free at one corner, the fingers may be inserted between a periodical which it is desired to remove, and the adjacent periodicals, and the desired periodical or unit most easily removed by pulling on it with an upward and outward movement, as indicated in Figs. 7 and 10. The individual periodical or unit may be replaced in much the same manner as it is removed, and with the same facility.

The binder may have data as to its contents readily indicated on either of the pair of overlapped end-flaps. For many purposes it is desirable to place this on the shorter of the end-flaps, as data appearing on the spines or backs of the periodicals, etc., is thus exposed to view. The data may be typed on a piece of gummed paper, and the gummed paper fastened over the end-flaps, as best illustrated in Fig. 10.

Magazines, periodicals and the like, are not marred and strained as they are in types of binders which are provided with means for fastening the individual magazines thereto. For preserving periodicals, keeping them in order, preserving the appearance of an office, providing accessibility and convenience of use, economy of shelf space, etc., the present binder is superior to anything heretofore available. These advantages are obtained coincidentally with economy of expense and flexibility in accommodating the dimensions of the binder to the bulk or volume-thickness, and also to the "trim" size, of magazines and periodicals, as to which there is great variation.

What is claimed is:

1. A binder or holder for groups of periodicals and the like, rectangular in cross-section, open at the top and composed of two substantially enantiomorphic pieces of sheet material each having only one side portion, and front and back end-flaps and a bottom flap, the flaps on one piece being folded and cut so as to overlap the flaps on the companion enantiomorphic piece, and means for fastening together the overlapped flaps the two side portions and four end flaps forming four vertical sides, and adapted to hold said periodicals in an upright position.

2. A binder or holder for groups of periodicals and the like, open at the top and composed of two substantially enantiomorphic pieces of sheet material, each having front and back end-flaps and a bottom flap, the flaps on one piece being folded and cut so as to overlap the flaps on the companion enantiomorphic piece, and means for fastening together the overlapped flaps, one of the end-flaps of each piece being of substantially less height than the height of periodicals, approximating the height of the opposite end-flap, for which the binder is designed, the upper portions of the sides slanting from the low end-flaps to the opposite end-flaps, to provide freedom at one corner of the binder for separating units of the contents to enable a unit to be readily grasped and removed, or replaced, without excessive strain on the binder.

3. A binder or holder for groups of periodicals and the like, rectangular in cross-section, open at the top and composed of two substantially enantiomorphic pieces of sheet material, each having only one side portion, and front and back end-flaps and a bottom flap, the flaps on one piece being folded and cut so as to overlap the flaps on the companion enantiomorphic piece, pronged fasteners holding together the overlapped front and back end-flaps, and an adhesive holding together the overlapped bottom flaps the two side portions and four end flaps forming four vertical sides, and adapted to hold said periodicals in an upright position.

4. As a commodity unit, a pair of substantially enantiomorphic flat pieces of sheet material constituting when assembled and fastened together the components of a binder or holder for groups of periodicals, for example a volume-group, and the like, each of said pieces of sheet material comprising a body or side-constituting portion, front and back end-flaps and a bottom flap, creases between the flaps and the body, or side-constituting portion, of the piece, said flaps having a width corresponding to the maximum bulk or volume thickness according to experience or custom, of volume groups of serial magazines or periodicals, the portions of said flaps at the free margins providing material which may be trimmed or severed to fit the assembled enantiomorphic pieces to groups of periodicals making up a volume, of various bulk or volume-thickness.

5. As a commodity unit, a pair of substantially enantiomorphic flat pieces of sheet material constituting when assembled and fastened together the components of a binder or holder for groups of periodicals, for example a volume-group, and the like, each of said pieces of sheet material comprising a body or side-constituting portion, front and back end-flaps and a bottom flap, creases between the flaps and the body, or side-constituting portion, of the piece, said flaps having a width corresponding to the maximum bulk or volume-thickness, according to custom or experience, of volume groups of serial magazines or periodicals, the portions of said flaps at the free margins providing material which may be trimmed or severed to fit the assembled enantiomorphic pieces to groups of periodicals making up a volume, of various bulk or volume-thickness, one end-flap of each piece being of substantially less height than the height of periodicals, approximating the height of the opposite end-flap, for which the binder is designed, the upper portion of the side-constituting portion of the piece slanting from the low end-flap to the opposite end-flap to provide freedom at one corner of the assembled pieces for separating a periodical or unit of the contents to enable a unit or periodical to be readily grasped and removed, or replaced, without excessive strain on the binder.

6. A commodity unit according to claim 4, further comprising severing guides parallel with the free margins of each flap.

7. A commodity unit according to claim 4, further comprising a plurality of creases between the body and an end-flap of each piece so that the pair of substantially enantiomorphic pieces when set up as a binder may be fitted to periodicals of various trim-size page-widths.

8. A commodity unit according to claim 4, wherein the height of each of the substantially enantiomorphic pieces corresponds to the maximum height, according to custom or experience, of periodicals in a class having approximately similar trim-size page-widths, the top portions of said pieces providing material which may be trimmed or severed to make the height of the assembled enantiomorphic pieces conform to the trim-size page height of the periodicals with which the binder is to be used.

9. A commodity unit according to claim 4, further comprising a plurality of creases between the body and an end-flap of each piece so that the pair of substantially enantiomorphic pieces when set up as a binder may be fitted to periodicals of various trim-size page widths, the bottom flap of each piece extending beneath said plurality of creases so that the bottom flaps may be cut to make the length of the bottom flap conform to the width of the body portion as determined by the crease on which the end-flap adjacent the plurality of creases is folded.

GUSTAVE R. THOMPSON.